United States Patent [19]

Musha et al.

[11] 4,242,682
[45] Dec. 30, 1980

[54] MOVING TARGET INDICATION RADAR

[75] Inventors: Toshimitsu Musha, Machida; Matsuo Sekine, Tokyo; Takeru Irabu, Tokyo; Eichi Kiuchi, Tokyo, all of Japan

[73] Assignee: Nippon Electric Co., Ltd., Tokyo, Japan

[21] Appl. No.: 71,614

[22] Filed: Aug. 31, 1979

[30] Foreign Application Priority Data

Aug. 31, 1978 [JP] Japan ............................. 53-107048

[51] Int. Cl.³ .................... G01S 7/30; G01S 13/52
[52] U.S. Cl. ........................... 343/7 A; 343/5 CF; 343/7.7
[58] Field of Search ............... 343/5 CF, 7 A

[56] References Cited

U.S. PATENT DOCUMENTS

| 3,946,382 | 3/1976 | Kossiakoff et al. | 343/5 CF X |
| 4,053,885 | 10/1977 | Tomita et al. | 343/7 A X |
| 4,104,633 | 8/1978 | Donahue et al. | 343/5 CF X |
| 4,137,532 | 1/1979 | Taylor, Jr. et al. | 343/5 CF X |

*Primary Examiner*—T. H. Tubbesing
*Attorney, Agent, or Firm*—Sughrue, Rothwell, Mion, Zinn and Macpeak

[57] ABSTRACT

A moving target indication radar rejects clutter by employing a suppressor having a threshold level variable in accordance with the detected shape parameter $\eta$ of the Weibull distribution.

10 Claims, 6 Drawing Figures

MOVING TARGET INDICATION RADAR

BACKGROUND OF THE INVENTION

1. Field of the Invention

The invention relates to a moving target indication radar and, more particularly, a radar of this kind capable of effectively rejecting undesirable returns (clutter) caused particularly by rain fall, sea surface and the like.

2. Prior Art

A radar system, particularly an air traffic control (ATC) radar, must discriminate the returns from moving objects (targets) from those undesirable returns from the stationary objects such as buildings and hills.

The undesirable returns include ground clutter attributed to buildings and undulating terrains, sea clutter caused by sea surface, weather clutter caused by rainfall and rain clouds, angel echo arising from large flocks of migrating birds, and the like. The conventional MTI (moving target indicator) is well adapted for rejecting the ground clutter among those clutters. The MTI canceller, however, is unable to reject a clutter having a speed component such as sea clutter, angel echo, weather clutter and the like. The dual-beam technique designed to reduce the receiver gain for low angle incidence returns at a close range is used for sea clutter and angel echo thereby to improve the S/C ratio, the ratio of the target return to the clutter. The circular polarized wave converter is used for weather clutter for the same purpose. Since those clutters have various levels, the receiver tends to be saturated, with a result that the target return is buried in those clutters making it impossible to detect or discriminate the target returns.

LOG-CFAR (Logarithmic Amplification and Constant False Alarm Rate) technique, which has been proposed to alleviate these disadvantages, is discussed in detail in a paper entitled "Detection Performance of the Cell Averaging LOG/CFAR Receiver" by V. G. Hansen and H. R. Ward, IEEE Transactions on AES, AES-8, No. 5, pp. 648-652, 1972. The LOG/CFAR technique, based on the fact that the sea and weather clutters each have an amplitude distribution similar to the Rayleigh distribution, employs the combination of a logarithmic amplifier and a CFAR circuit (including an average value measuring circuit and an anti-logarithmic converter) to suppress the clutter components to a level comparable to the noise level inherent in the radar receiver, and to optimize the threshold level with respect to the level suppressed, whereby the probablility that the clutters are detected erroneously as the target returns, called false-alarm rate, is rendered constant.

However, the LOG/CFAR technique is effective only when the amplitude distribution of the clutter signal is analogous to the Rayleigh distribution. Accordingly, it fails to attain the constant-false-alarm rate (CFAR) for clutter signals with other amplitude distributions resulting in the increase of clutter residue.

As stated above, the LOG/CFAR technique involves the problem of clutter residue. Recent observations show that clutters with amplitude distribution analogous to the Rayleigh distribution are rare, and that most of the clutters have the Weibull distribution. This is discussed in a paper entitled "Radar Detection in Weibull Clutter" by D. C. Schleher, IEEE Transaction on AES, AES-12, No. 6, pp. 736-743 (1976).

A proposal has been made for a technique to attain a constant false-alarm rate in Weibull clutter, by V. Gregers Hansen in his paper entitled "Constant False Alarm Rate Processing in Search Radars" presented at the International Conference on RADAR-PRESENT AND FUTURE, 23-25 October 1973.

This technique is capable of obtaining a constant false-alarm rate if the cumulative density function of a radar return signal is known even if the return signal has any type of time-domain distribution of amplitudes including the Weibull distribution. To describe in brief, when the cumulative density function $q(x)$ of an input signal x is known, the input signal is subjected to a specific variable transformation $(Z=\log[1-q(x)])$ which is determined by the cumulative density function so that the distribution of the input signal is transformed into an exponential distribution $(P_E(Z)=\exp(Z))$ whose parameters are determined by such distribution characteristics of the input signal as the average value, the variance and the energy and are constant.

Although the above-described technique may attain the constant false-alarm rate even for clutter with the Weibull distribution, it is still not completely satisfactory, particularly when processing clutters having the Rayleigh distribution. Since the Rayleigh distribution is a special case of the Weibull distribution, theoretically, the processing method for the Weibull clutter must be applicable to clutters of Rayleigh distribution. Practically, however, when applied to the processing of the Rayleigh clutters, it is inferior to the conventional LOG/CFAR technique. This technique requires the variable conversion of the input signal and, accordingly, additional circuits therefor. Thus, the conventional technique stated above involves complicated hardware and an increase in errors arising from the variable conversion processing.

Another proposal to attain the constant false-alarm rate for Weibull clutters has been made by G. B. GOLDSTEIN in his paper entitled "False-Alarm Regulation in Log-Normal and Weibull Clutter" published in the IEEE Transactions on AES, VOL. AES-9, No. 1, pp. 84-92 (January 1973). The proposed technique is applicable only to a specified Weibull clutter having two unique parameters defining the amplitude distribution. In the proposed technique, a threshold value is calculated to attain the constant false-alarm rate based on the comparison of the threshold value and a signal resulting from the logarithmic conversion of the input signal.

Furthermore, since the threshold value is calculated only for a specific Weibull clutter as stated above, it fails to attain the constant false-alarm rate for a general Weibull clutter with different parameters. Therefore, for this technique to be applied to the general Weibull clutter, the following processing will have to be made although not referred to in the paper. The estimated values of the parameters must be set in advance to allow the threshold values for all the combinations of these parameter values to be calculated and then stored in a memory such as a read only memory (ROM). Two parameters to define the Weibull distribution must then be measured from an input signal to enable the threshold value to be calculated on the basis of the measured parameters.

However, this requires a ROM memory of large capacity and a great number of processing steps, complicating the circuit structures.

SUMMARY OF THE INVENTION

Accordingly, an object of the invention is to provide a moving target indication radar capable of sufficiently suppressing clutters having the general Weibull distribution.

Another object of the invention is to provide a moving target indication radar capable of sufficiently suppressing Rayleigh clutter as well as Weibull clutter.

Still another object of the invention is to provide a moving target indication radar capable of suppressing Weibull clutter with a simplified circuit arrangement.

Yet another object of the invention is to provide means for measuring the parameter values of a Weibull distribution function so as to remove Weibull clutters.

According to the present invention, there is provided a moving target indication radar comprising means for logarithmically converting a radar return signal x having the Weibull distribution and the probability density function $P_\eta(x)$ given by $$P_\eta(x) = \frac{\eta}{\sigma}\left(\frac{x}{\sigma}\right)^{\eta-1} \exp\left[-\left(\frac{x}{\sigma}\right)^\eta\right]$$

and $\eta$ are parameters determined by the amplitude distribution of the radar return signal), means for measuring the average value of radar data in the range direction corresponding to logarithmic-converted radar return signals extracted from a plurality of the unit range regions, means for subtracting the average value from said return signal from a selected one of the plurality of the unit range regions, means for anti-logarithmically converting the result of the subtraction, means for measuring the parameter $\eta$ from the radar returned signal, and means for setting a threshold value corresponding to the parameter $\eta$. With such a construction, a low and constant false-alarm rate can be attained by extracting a signal whose amplitude is larger than the threshold value extracted from the anti-logarithmic converted signals.

The other objects and features of the invention will be apparent from the following description taken in connection with the accompanying drawings, in which:

DESCRIPTION OF THE PREFERRED EMBODIMENTS

Before proceeding with the preferred embodiments of the invention, a principle of the present invention will be described. Generally, a probability density function $P(x)$ of a clutter with amplitude x is a Weibull function expressed by $$P_\eta(X) = \begin{cases} \frac{\eta}{\sigma}\left(\frac{X}{\sigma}\right)^{\eta-1} e^{-\left(\frac{X}{\sigma}\right)^\eta}, & X > 0, \sigma > 0, \eta > 0 \\ 0 & \text{Otherwise} \end{cases} \quad (1)$$

where $\sigma$ is a scale parameter and $\eta$ is a shape parameter. The Rayleigh distribution function $R(x)$ is generally expressed by $$R(X) = \frac{2X}{\sigma^2} e^{-\left(\frac{X}{\sigma}\right)^2} \quad (2)$$

These equations show that the Rayleigh function (2) corresponds to equation (1) when the parameter $\eta$ is 2. Accordingly, equation (2) is a special case of equation (1). In other words, the Weibull distribution includes the Rayleigh distribution.

As described above, when a radar return signal reflected from an object existing in the scanned space is obtained as an input video signal x in a radar system, the statistical amplitude characteristic of the input signal x is expressed by the Weibull function of equation (1). Let the input signal x be applied to the common LOG/CFAR circuit. When the input signal x is amplified by a logarithmic amplifier, the output signal of the logarithmic amplifier is given by $$y = a \ln(bx) \quad (3)$$

where a and b are constants given by the characteristic of the logarithmic amplifier. An average value $<y>$ of the output signal y in the range direction is given $$<y> = \int_0^\infty y P_\eta(x) dx \quad (4)$$

$$= a \ln(b\sigma) + \frac{a}{\eta} \psi(l)$$

where $\psi(m)$ is a function defined by the following equation $$\psi(m) = \frac{d}{dm} \ln[\Gamma(m)] \quad (5)$$

where $\psi(l) = -\gamma$ and $\gamma = 0.5772$ which is the Euler's constant, and $\Gamma(m)$ is a gamma function.

Let y denote the output signal of the logarithmic amplifier. A subtractor executes an operation of $y - <y>$, and the result of the subtraction is given $$v = y - <y> \quad (6)$$

This value is further applied to an anti-logarithmic converter where it is subjected to an anti-logarithmic conversion to give $$Z = ce^{dv} \quad (7)$$

where c and d are constants determined by the characteristic of the anti-logarithmic converter.

When equations (3), (4) and (6) are put into equation (7), and the constants are set up so as to satisfy $ad = 1$, the output signal from the anti-logarithmic converter is given by the following equation.

$$Z = c \frac{x}{\sigma} e^{-\frac{1}{\eta} \psi(1)} \quad (8)$$

An average and a square average of X, $<Z>$ and $<Z^2>$, are given respectively by $$<Z> = \int_0^\infty C \frac{x}{\sigma} e^{-\frac{1}{\eta}\psi(1)} \cdot P_\eta(x)dx = \quad (9)$$

$$ce^{-\frac{1}{\eta}\psi(1)} \Gamma(\frac{1}{\eta} + 1)$$

$$<Z^2> = \int_0^\infty C^2 (\frac{x}{\sigma})^2 e^{-\frac{2}{\eta}\psi(1)} \cdot P_\eta(x)dx = \quad (10)$$

$$C^2 e^{-\frac{2}{\eta}\psi(1)} \Gamma(\frac{2}{\eta} + 1)$$

Therefore, the variance Var (Z) of the Z is given as $$Var (Z) = <Z^2> - <Z>^2 \quad (11)$$

$$= C^2 e^{-\frac{2}{\eta}\psi(1)}[\Gamma(\frac{2}{\eta} + 1) - \Gamma^2(\frac{1}{\eta} + 1)]$$

As seen from equation (11), the variance Var(Z) is determined only by the parameter $\eta$. Therefore, if a specific value is applied to the parameter $\eta$, the variance Var(Z) takes a stationary value. This means that if clutters having various values of parameter $\eta$ are subjected to the ordinary LOG/CFAR processing and the value of parameter $\eta$ is determined by some means, a proper threshold value is set up by using this value, enabling the target detection at a constant false-alarm rate.

The average-square value of y is $$<Y^2> = \int_0^\infty a^2 \ln^2(bx) P_\eta(x) \quad (12)$$

$$= a^2 \ln^2(b\sigma) + \frac{2a^2}{\eta} \ln(b\sigma) \psi(1)$$

$$+ \frac{a^2}{\eta} [\frac{\pi^2}{\sigma} + \psi^2(1)]$$

By using equations (4) and (12), we have $$<Y^2> - <Y>^2 = \frac{a^2}{\eta^2} \cdot \frac{\pi^2}{6} \quad (13)$$

As seen from equation (13), the value obtained depends on a constant a which is determined by the characteristic of the logarithmic amplifier and the parameter $\eta$ of Weibull distribution. Therefore, the parameter $\eta$ is obtained by the following equation.

$$\eta = [(<Y^2> - <Y>^2) \frac{6}{a^2 \pi^2}]^{-\frac{1}{2}} \quad (14)$$

As described above, if the value of $\eta$ in equation (11) is known, the variance Var(Z) is determined.

Therefore, if a parameter judging means having a function to operate equation (14) and a threshold control means for controlling the threshold value depending on the output signal from the parameter judging means are additionally used in the conventional LOG/CFAR system, target detection at a constant false-alarm rate is made possible when the return signal includes various clutters having the Weibull distribution. Since the number of input data to be processed in an actual radar system is finite, an error is produced in the measured average values expressed in equations (4) and (12). Accordingly, an error is also produced in the parameter $\eta$ as seen from equation (14), and clutter residues increase. The clutter residue in the LOG/CFAR processing is known as the CFAR loss (see the above-mentioned paper "DETECTION PERFORMANCE OF THE CELL AVERAGING LOG/CFAR RECEIVER"). In an ARSR (Air Route Surveillance Radar) or an ASR (Airport Surveillance Radar) in actual use, the number of equivalent hits from a target is ten or more and, further, the output signal is integrated so that the CFAR loss may be controlled to be approximately 1 dB. Accordingly, the CFAR loss affects the detection of the target return signal very little.

An embodiment of the moving target indication radar constructed on the basis of the above-mentioned principle of the invention will be described with reference to FIG. 1. As shown, the moving target indication radar according to the invention generally has a transmitter-receiver portion 11, a signal processing portion 12, and a timing signal source 13, as in a conventional radar system. The transmitter-receiver portion 11 has a frequency stabilized oscillator 111 for generating a microwave signal at frequency $f_s$, a coherent oscillator 112 of frequency $f_c$ for giving a reference phase for the radar signal detection by the transmitter-receiver portion 11, a frequency mixer 113 for mixing the outputs of these oscillators 111 and 112 to provide an output of frequency $f_s + f_c$, a Klystron amplifier 114 for amplifying the output of the mixer 113, a trigger pulse generator 115 for pulse-modulating the amplifier 114 to provide a microwave pulse, and a duplexer 117 for leading the microwave pulse to an antenna 116. Also, the transmitter-receiver portion 11 has a second frequency mixer 118 to provide an IF signal at frequency $f_c \pm f_d$ ($f_d$ is doppler frequency deviation), by mixing the output of the stabilized oscillator 111 and the radar return signal from a radar scanned space coming in through the antenna 116 and the duplexer 117, an IF amplifier 119, and an amplitude detector 120 for detecting the amplitude of the output of the IF frequency amplifier 119 and a pair of phase detectors 121 and 122 connected in parallel and receiving the output of the IF amplifier 119 and supplied with the reference phase oscillation directly and through a 90° phase shifter 123 from the coherent oscillator 112, respectively.

As seen from the construction mentioned above, the radar pulse of microwave frequency $f_s + f_c$ and of repetition frequency equal to the above-mentioned trigger pulse is transmitted through the antenna 116 into a scanned space and is reflected at various objects in the space and then is returned as the radar return signal to the antenna 116 to be led to the mixer 118. The Doppler speed components (including zero-Doppler speed component) of frequency deviation $f_d$ attributed to the stationary and moving objects lying in the scanned space are detected by the phase detectors 121 and 122 to form Doppler speed data or Doppler frequency data.

The pulse generator 115 responds to a timing pulse supplied from a terminal (a) of the timing signal source 13 and then generates a trigger pulse, 0.8 microseconds in width and 1,000 Hz in repetition frequency (i.e., repetition frequency of the microwave pulse produced by the Klystron amplifier 114). The rotation period of the antenna 116 in the azimuthal direction is selected to be 4 seconds. Under these conditions, the transmitter-receiver portion 11 extracts the radar data with the whole 360° of azimuthal directions divided into 4,000 unit azimuth regions. As for the range direction, the 5 radar data are extracted for every one sixteenth nautical mile (nmi) corresponding to the pulse width, 0.8 microsecond, covering the whole 48 nmi nominal range. For simplicity of explanation, the embodiment is assumed to constitute an ASR, with these figures applied to the description to be given hereinafter.

As will be apparent from the description mentioned above, the radar of this embodiment is based on the radar data extraction from 4,000×768 unit range-azimuth regions. Radar data is obtained at the amplitude detector 120 for every radar pulse (i.e. for every unit azimuth region) and for the 1st to 768th unit range regions in this order. The analog data thus obtained are supplied to the logarithmic amplifier 124 for amplification and then applied to the A/D converter 125.

The A/D converter 125 converts the output of the logarithmic amplifier 124 into a binary code signal of 10 bits for each scanning pulse, i.e. for the unit range region radar data obtained for each of the 768 unit range regions contained in each unit azimuth region. More specifically, the A/D converter 125, being supplied with the 1.3 MHz clock pulse from the terminal (b) of the timing signal source 13 in synchronism with the radar scanning pulse, converts into a binary code signal at a bit rate of 1.3 MHz analog radar signals coming at a rate of 1,000 per second each having 768 unit range region radar data. Thus, the A/D converter 125 is adapted to perform the digitization within 0.8 microsecond for each of the unit range data to permit the real-time processing of the radar signal.

The signal processing portion 12 has a cell averaging LOG/CFAR unit 126 which averages the amplitude of the radar signals from a plurality of the unit range regions which are produced from the A/D converter 125, subtracts the averaged value from a radar signal from one of the plurality of the unit range regions and makes an anti-logarithmic conversion of the result of the subtraction, a parameter judging unit 128 for judging the clutter parameter $\eta$ in equation (1) by using the output of the A/D converter 125, and a threshold control unit 127 for optimally controlling a threshold value on the basis of the outputs from the parameter judging unit 128. The signal processing portion 12 further has a pair of A/D converters 129 and 130, and an MTI canceller 131. The outputs of these A/D converters 129 and 130, both in parallel binary code, are representative, respectively, of the real and imaginary parts of the complex radar data from the phase detectors 121 and 122, and are applied to the MTI canceller 131 to be subjected to the clutter rejection process as described in U.S. Pat. No. 4,053,885 "MOVING TARGET INDICATION RADAR" assigned to the same assignee as the present application. The output of the threshold control unit 127 is a signal with suppressed clutter and, together with the output of the MTI canceller 13, is subjected to a signal processing for determining the target position and then fed to a display section (not shown).

Figure 2:
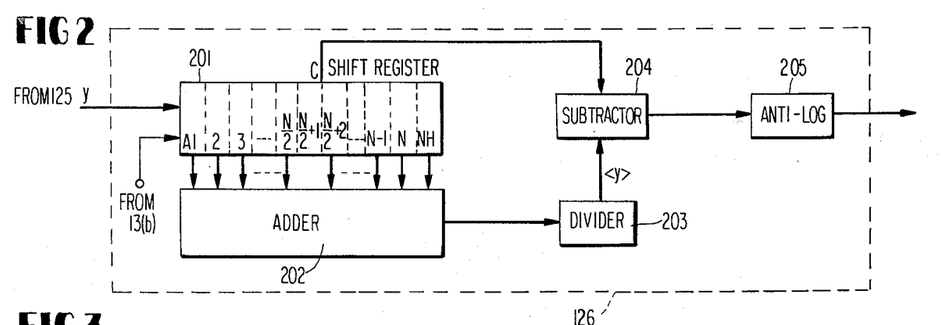
FIG. 2 shows a block diagram of a cell averaging LOG/CFAR unit used in the moving target indication radar according to the invention.

The detailed construction and the operation of the cell averaging LOG/CFAR unit 126 will be described with reference to FIG. 2. The cell averaging LOG/CFAR unit 126 is comprised of a shift register 201 which has (N+1) shift stages and performs the shift operation in response to a clock signal of 1.3 MHz delivered from the timing signal source 13(b), an adder 202 for taking out N radar data (N is an even number), except the data stored in the central stage C of the shift register 201, from the (N+1) radar data stored in the shift register 201 and for summing these radar data, a divider 203 for dividing the output of the adder 202 by N, a subtractor 204 for subtracting an output of the divider 203 from the data stored at the central stage C of the shift register 201, and an anti-logarithmic converter 205 for executing an anti-logarithmic conversion of the output signal from the subtractor 204.

In operation, the radar data y supplied from the A/D converter 125 are sequentially applied to the shift register 201 in response to clock signals of 1.3 MHz derived from the timing signal source 13(b) and then are shifted therein. The radar data y applied are the return signals reflected from the unit range regions extending in the range direction. At the time point that the (N+1)th radar data (N is an even number) is inputted to the shift register 201, the adder 202 sums the data of N (except that N/2+1)th) radar data stored in the shift register 201 and the sum is divided by N in the divider 203 to obtain the average $<y>$ of the radar data coming from the range regions. If the target signal is superposed on the clutter, the target signal, together with the clutters, is suppressed in the clutter suppressive processing so that the S/N ratio is deteriorated. To prevent this, the (N/2+1)th radar data is not included in the data to be summed in the adder 202.

The radar data stored in the central stage C of the shift register 201 is applied to the subtractor 204 where the average value $<y>$ from the divider 203 is subtracted from the radar data stored in the central stage of the shift register 201. The anti-logarithmic converter 205 is comprised of read only memory (ROM) which receives the output of the subtractor 204 as an address signal and produces an output signal representing a previously calculated logarithmic value. In other words, the anti-logarithmic converter 205 makes an anti-logarithmic conversion of the output of the subtractor 204 and supplies the converted signal to the threshold control unit 127.

Figure 3:
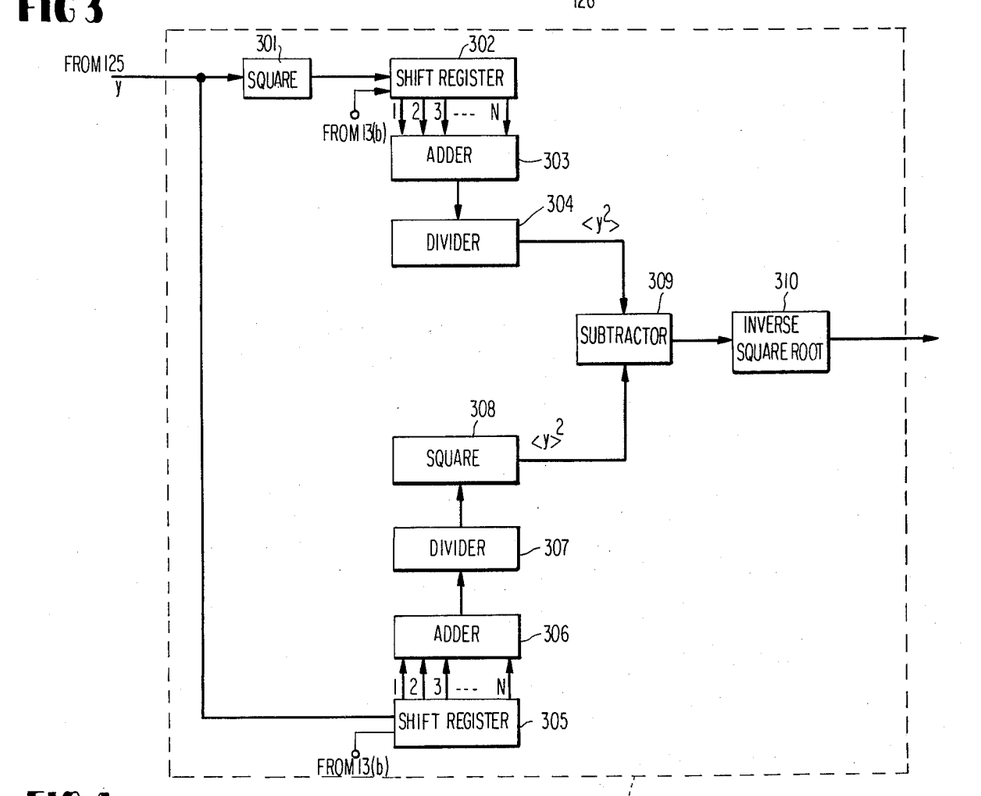
FIGS. 3 and 6 are block diagrams of parameter judging units used in the radars shown in FIGS. 1 and 5.

The parameter judging unit 128 is constructed as shown in FIG. 3. The radar data supplied from the A/D converter 125 is branched into two routes: one including a square circuit 301, a shift register 302 shifted by a clock signal supplied from the timing signal source 13(b) and having N shift stages (N is a natural number), an adder 303 and a divider 304; the other including a shift register 305 with the same function as that of the shift register 302, an adder 306, a divider 307 and a square circuit 308. The radar data stored in the shift register 302 are summed by the adder 303 and the result of the addition is then divided by N, thereby to have a square average $<y^2>$. On the other hand, the divider 307 produces an average $<y>$, in a similar manner. The output of the divider 307 is applied to the square circuit 308 which in turn produces a square value of the average $<y>^2$.

A subtractor 309 provides a difference between the square average $<y^2>$ and the square of the average $<y>^2$. The difference is applied to an inverse square root calculator 310. The inverse square root calculator 310 multiplies the output $<y^2>-<y>^2$ of the subtractor 309 by $6/a^2\pi^2$ and produces an inverse square root value of the result of the multiplied value. The output from the circuit 310 provides a parameter expressed by the equation (14).

Figure 4:
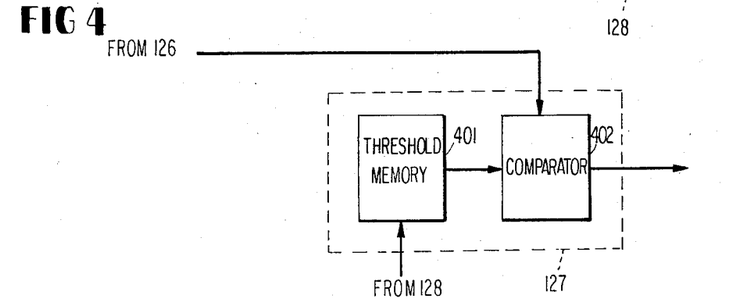
FIG. 4 is a block diagram of a threshold control unit which is a component of the moving target indication radar according to the invention.

The threshold control unit 127 is constructed as shown in FIG. 4. The threshold memory circuit 401, which is comprised of a memory device such as a ROM, stores values optimally determined on the basis of a threshold value theoretically calculated for various values of the parameter $\eta$ of the Weibull distribution function and an actually measured data. The threshold memory circuit 401 produces threshold values corresponding to values of the parameter $\eta$. The comparator 402 compares the output from the cell averaging LOG/CFAR circuit 126 with the threshold value supplied from the threshold memory unit 401, to bring out a target return signal having a level above the threshold value.

The above processing is performed for every single input radar data of the return signal supplied from the unit range region. It is evident, of course, that the processing may intermittently be performed for every given number of the radar data. In this case, the threshold value on the basis of the parameter $\eta$ obtained by the just-before processing is used until the parameter $\eta$ is obtained in the next processing.

Figure 5:
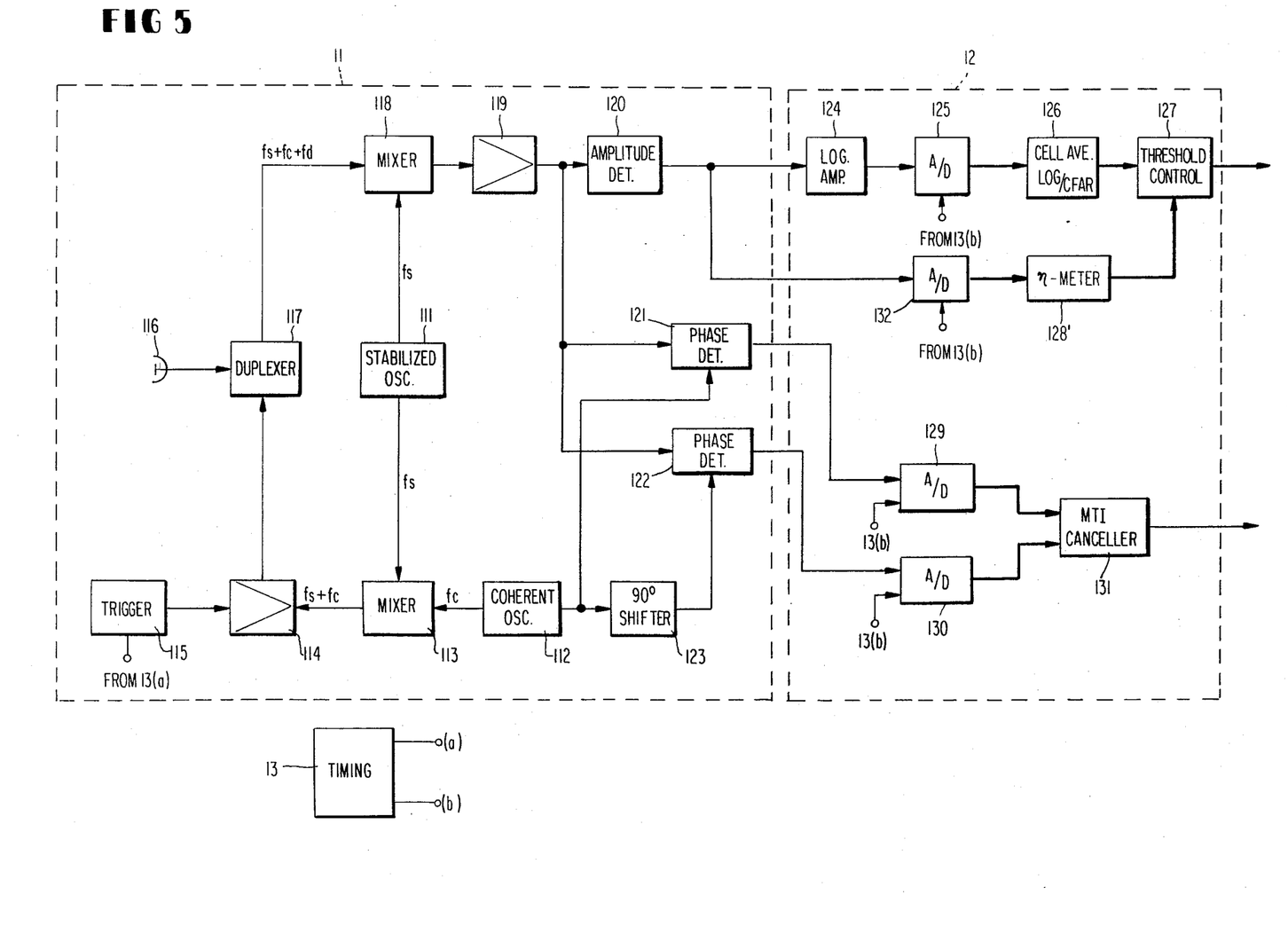

There is an alternative technique for judging the Weibull parameter $\eta$. While the above-mentioned means (referred to as a first means) uses the output signal from the logarithmic amplifier 124, an alternative means (referred to as a second means) to be described later uses the output x of an amplitude detector 120, as shown in FIG. 5. From equation (1), we easily obtain an average $<x>$ and a square average $<x^2>$, as follows:

$$<x> = \int_0^\infty x P_\eta(x) dx = \sigma \Gamma(\frac{1}{\eta} + 1) \quad (15)$$

$$<x^2> = \int_0^\infty x^2 P_\eta(x) dx = \sigma^2 \Gamma(\frac{2}{\eta} + 1) \quad (16)$$

From equations (15) and (16), we have $$\frac{<x>^2}{<x^2>} = \frac{[\sigma \Gamma(\frac{1}{\eta} + 1)]^2}{\sigma^2 \Gamma(\frac{2}{\eta} + 1)} = \frac{[\Gamma(\frac{1}{\eta} + 1)]^2}{\Gamma(\frac{2}{\eta} + 1)} \quad (17)$$

$$\frac{<x>}{\sqrt{<x^2>}} = \frac{\Gamma(\frac{1}{\eta} + 1)}{\sqrt{\Gamma(\frac{2}{\eta} + 1)}} \quad (18)$$

As seen from the above equations (17) and (18), these ratios, $<x>^2/<x^2>$ and $<x>/\sqrt{<x^2>}$, are determined by the Weibull parameter $\eta$. Therefore, if those ratios are obtained, the parameter $\eta$ may be obtained. In this embodiment, equation (17) is used.

Figure 1:
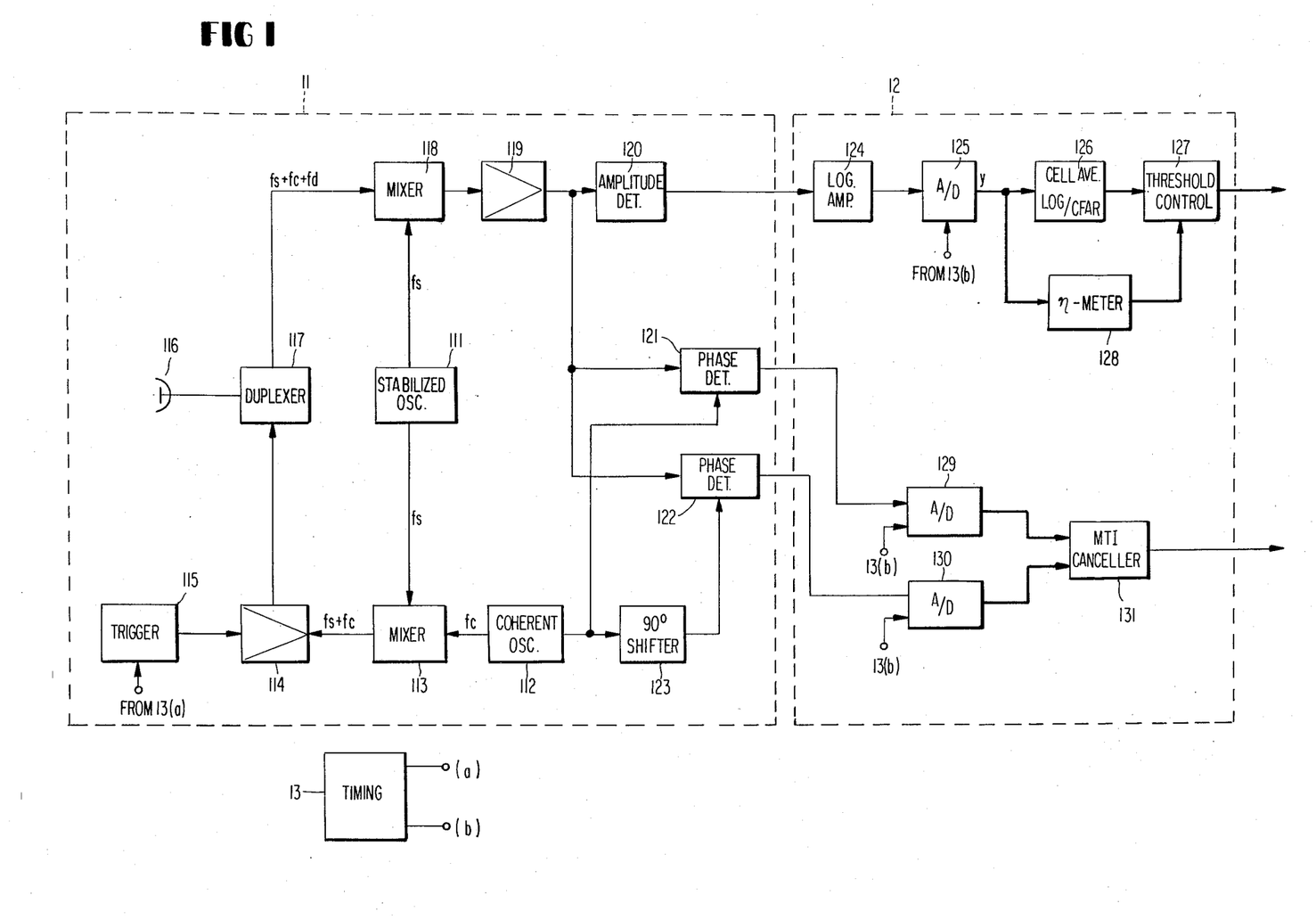
FIGS. 1 and 5 are block diagrams of moving target indication radars according to the invention.
Figure 6:
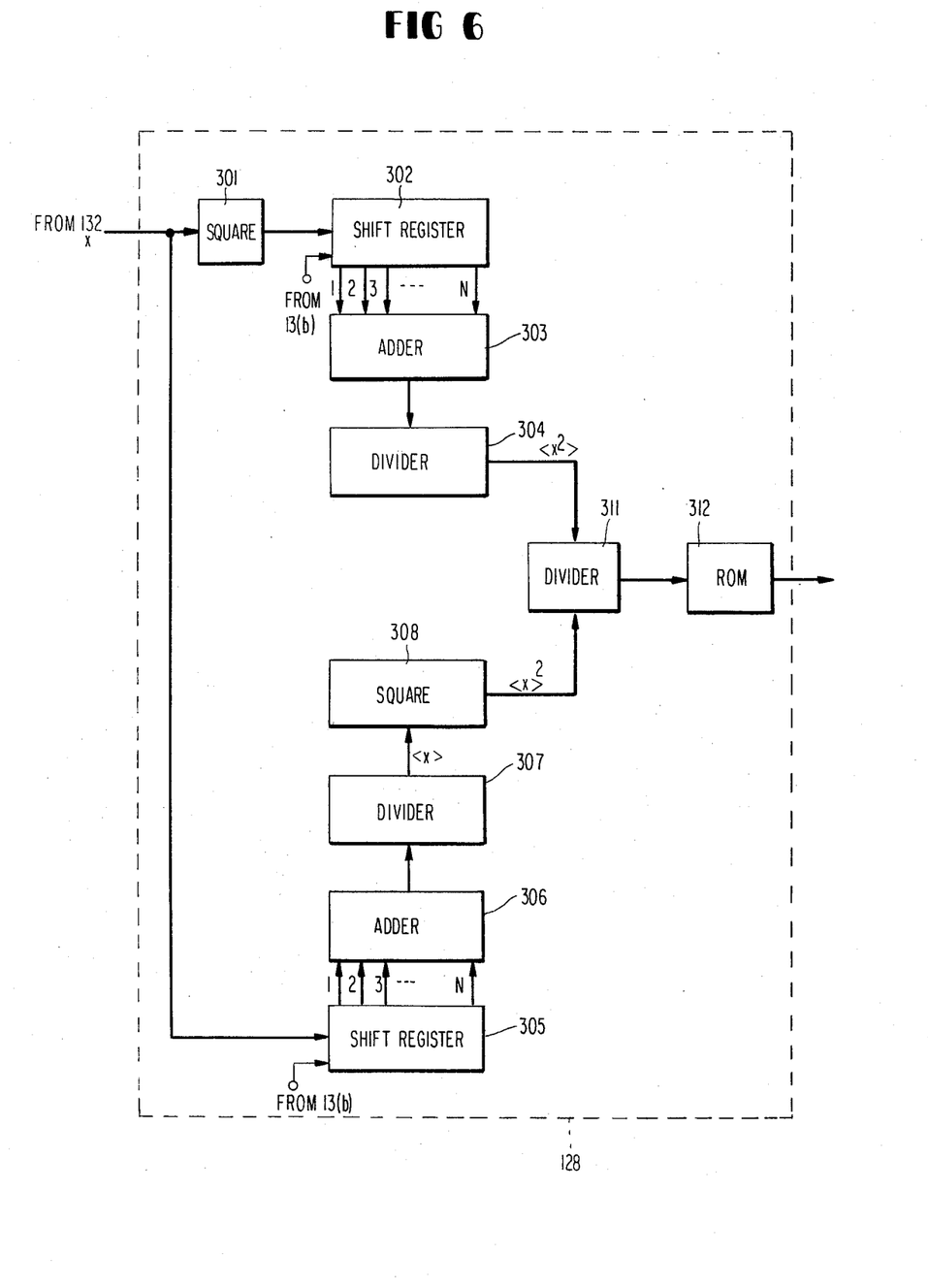

The first means 128 shown in FIG. 1 depends on equations (4), (12), (13), and (14) while the second means 128' shown in FIG. 5 depends on equations (15), (16) and (17). The block diagram of the second means 128' is shown in FIG. 6. It is seen from equations (13) and (17) that the second means must use a divider 311 in place of the subtractor 309 in the first means. Further, the second means does not need inverse square root calculation for equation (14) of the first means. Accordingly, in the second means, the inverse square root calculation circuit 310 in the first means is replaced by a memory device 312 such as an ROM which produces the parameter $\eta$ in response to the output of the divider 311. Additionally, in the second means, an A/D converter 132 for quantizing the output of the amplitude detector 120 is inserted between the amplitude detector 120 and the parameter judging unit 128', as shown in FIG. 5.

In the embodiment shown in FIG. 1, the digitized signal obtained through the following circuits, the IF amplifier 119, the amplitude detector 120, the logarithmic amplifier 124 and A/D converter 125 is used for the input data to the parameter judging unit 128. However, the logarithmic-converted value after the output of the amplitude detector 120 is subjected to an A/D conversion may also be used for the input data to the parameter judging unit 128 without adversely affecting the subsequent CFAR processing.

This is also true for the construction shown in FIG. 5, and can be realized by omitting two A/D converters 125 and 132 and providing a single A/D converter before the logarithmic amplifier 124. The input to the parameter judging unit 128' can then be taken from the single A/D converter. Accordingly, the arrangement saves hardware.

In this case, an ROM is used for the logarithmic converter and the logarithmic-converted values corresponding to the input data are stored in the ROM and are read out in response to address signals provided by the A/D converter.

What is claimed is:

1. A moving target indication radar comprising:

a transmitting means for transmitting a microwave pulse of a predetermined width at a predetermined repetition period into space through an antenna rotating at a constant speed;

a receiving means for receiving pulse returns from stationary and moving objects lying in the space scanned by said antenna, said pulse returns being received for every unit azimuth region corresponding to one microwave pulse in the form of a chain of radar data respectively for unit range regions related to the width of said microwave pulse, said pulse returns including a Weibull clutter having the probability density function $P_\eta(x)$ for its envelope given by $$P_\eta(x) = \frac{\eta}{\sigma} (\frac{x}{\sigma})^{\eta-1} \exp[-(\frac{x}{\sigma})^\eta]$$

where $\sigma$ and $\eta$ are parameters dependent on the envelope distribution of said pulse returns;

digitized logarithm means for providing a digitized value of the logarithm of the envelope of said pulse returns;

means responsive to the digitized value of the logarithm of the envelope for providing a signal representative of an average of the pulse returns from a predetermined number of adjacent ones of said unit range regions, and for subtracting said average signal from an incoming digitized pulse return corresponding substantially to the middle one of said unit range regions;

means responsive to the output of the averaging-subtracting means for providing a signal representative of an anti-logarithm of the input thereto;

parameter means responsive to the digitized pulse returns for developing a signal representative of said parameter $\eta$; and a threshold detection means, having a threshold which is variable in response to said $\eta$ representing signal, and passing those components of said anti-logarithm output having amplitudes higher than said threshold value; whereby the output of said variable threshold means constitutes a radar video signal virtually free from said Weibull clutter.

2. A moving target indication radar as claimed in claim 1, wherein said digitized logarithm means comprises:

first digitizing means for digitizing said pulse returns; and logarithm means responsive to the output of said first digitizing means for providing an output digital signal representative of the logarithm of the envelope of said pulse returns; the output of said first digitizing means being provided as the input to said parameter means.

3. A moving target indication radar as claimed in claim 1, wherein said digitized logarithm means comprises:

logarithm means responsive to said pulse returns for providing a signal representative of the logarithm of the envelope of said pulse returns; and first digitizing means for digitizing the output of said logarithm means; the output of said first digitizing means being provided as the input to said parameter means.

4. A moving target indication radar as claimed in claim 1, wherein said digitized logarithm means comprises logarithm means responsive to said pulse returns for providing a signal representative of a logarithm of the envelope of said pulse returns and first digitizing means for providing a digitized value of the output of said logarithm means, said moving target indication radar further comprising:

second digitizing means receiving as its input the input of said logarithm means and providing to said parameter means digitized values of said pulse returns.

5. A moving target indication radar as claimed in claim 1, in which said parameter means comprises:

a first squaring circuit for squaring said digitized pulse returns;

a first averaging means coupled to the output of said first squaring circuit for providing signals representative of the average of the squared pulse returns;

second averaging means coupled directly to said digitized pulse returns for providing signals representative of the average of the unsquared pulse returns;

a second squaring circuit for squaring the output of said second averaging circuit;

means for providing a signal representative of the difference between the output of said first averaging means and said second squaring circuit; and means for providing a signal representative of an inverse square root of the output of said difference signal providing means.

6. A moving target indication radar as claimed in claim 5, wherein said difference signal generating means is composed of a subtractor for providing a signal representative of the division of the first averaging means by said second squaring circuit or vice versa, and in which said inverse square root signal providing means is composed of a read only memory.

7. A moving target indication radar as claimed in claim 5, in which each of said first and second averaging means includes a shift register having a given number of binary stages for storing said digitized pulse returns from the mutually adjacent unit range regions, an adder for summing the binary data stored in said binary stages and means for dividing the output of the adder by said given number.

8. A moving target indication radar as claimed in claim 1, in which said variable threshold detection means has a ROM having various threshold values stored therein for readout in response to said $\eta$ representing signal.

9. A moving target indication radar as claimed in claim 1, in which said means responsive to the digitized value of the logarithm of the envelope includes an averaging means comprising a shift register having a given number of binary stages for storing said digitized pulse returns from the mutually adjacent unit range regions, an adder for summing the binary data stored in said binary stages and means for dividing the output of the adder by said given number.

10. A moving target indication radar as claimed in claim 1, in which said anti-logarithm representing signal generating means comprises a read only memory with the anti-logarithms of possible input values stored therein for readout in response to the output of the averaging-subtracting means.

* * * * *

UNITED STATES PATENT AND TRADEMARK OFFICE
CERTIFICATE OF CORRECTION

PATENT NO. : 4,242,682

DATED : December 30, 1980

INVENTOR(S) : Musha et al

It is certified that error appears in the above—identified patent and that said Letters Patent is hereby corrected as shown below:

Column 3, line 28 - Before "and" insert -- ($\sigma$ --

Column 4, line 4 - After "P (X) =" insert -- $\left\{\vphantom{\int}\right.$ --

Column 9, line 37 - In Eq. (16) delete " $\dfrac{1}{(\dfrac{1}{\eta} + 1)}$ "

and insert --$(\dfrac{2}{\eta} + 1)$-- line 44 - After Eq. (17) and before Eq. (18) insert --or--.

Signed and Sealed this

Thirtieth Day of June 1981

[SEAL]

Attest:

RENE D. TEGTMEYER

*Attesting Officer*   *Acting Commissioner of Patents and Trademarks*

UNITED STATES PATENT AND TRADEMARK OFFICE
CERTIFICATE OF CORRECTION

PATENT NO. : 4,242,682
DATED : December 30, 1980
INVENTOR(S) : Toshimitsu Musha et al It is certified that error appears in the above—identified patent and that said Letters Patent is hereby corrected as shown below:

Page 1, line 73, Assignee should read:

--Assignee: Nippon Electric Co., Ltd., Tokyo, Japan, a part interest

Signed and Sealed this

Twenty-fifth Day of August 1981

[SEAL]

Attest:

GERALD J. MOSSINGHOFF

Attesting Officer

Commissioner of Patents and Trademarks